United States Patent [19]

Marchio' et al.

[11] Patent Number: 4,694,239
[45] Date of Patent: Sep. 15, 1987

[54] ELECTRONIC VOLTAGE REGULATING DEVICE WITH COMPENSATION FOR THERMAL DISSIPATION, PARTICULARLY FOR ALTERNATORS

[75] Inventors: Fabio Marchio', Busto Arsizio; Pietro Menniti, Milan, both of Italy

[73] Assignee: SGS Microelettronica S.p.A., Catania

[21] Appl. No.: 837,892

[22] Filed: Mar. 10, 1986

[30] Foreign Application Priority Data

Mar. 13, 1985 [IT] Italy ................. 19869 A/85

[51] Int. Cl.$^4$ ............................................. G05F 1/56
[52] U.S. Cl. ..................... 323/285; 323/907; 322/34
[58] Field of Search ............. 323/282, 285–287, 323/904; 322/33, 34; 320/32, 35–36, 39, 64

[56] References Cited

U.S. PATENT DOCUMENTS 4,220,908  9/1980  Nicol .......................... 322/33
4,237,412  12/1980 Rundlöf ..................... 322/33 X
4,470,003  9/1984  Mitchell ..................... 322/33 X

*Primary Examiner*—Peter S. Wong
*Attorney, Agent, or Firm*—Guido Modiano; Albert Josif

[57] ABSTRACT

The voltage regulating device, compensating the error due to the heat dissipated by the power element that drives the load, specifically an excitation winding of a motor car battery charging alternator, comprises a control stage including a temperature sensing element and a power stage driven by the control stage for generating an output voltage dependent on the ambient temperature. The power stage includes a sensor for detecting the power dissipated therein and generating a dissipated power signal fed to a compensation section in the control stage which also receives the temperature signal detected by the temperature sensing element for generating an actual ambient temperature signal unaffected by the error due to internal heat dissipation.

5 Claims, 2 Drawing Figures

ELECTRONIC VOLTAGE REGULATING DEVICE WITH COMPENSATION FOR THERMAL DISSIPATION, PARTICULARLY FOR ALTERNATORS

BACKGROUND OF THE INVENTION

This invention relates to an electronic voltage regulating device with compensation for thermal dissipation, particularly for alternators.

Many applications, such as regulating systems for battery charging on motor cars, require that the power voltage to a load be varied in conformity with ambient temperature. To that aim, a temperature responsive element is provided which can output a signal correlated to the outside temperature and drives a power circuit for powering the load.

Such device types are known in two forms thereof. More specifically, devices are known which are formed of discrete elements wherein the temperature responsive element is physically separated from the power circuit powering the load. Also known are hybrid devices composed of an integrated structure, wherein the power element is mounted externally. The exterior location of the power element powering the load is dictated by the power dissipated in the power circuit causing a local temperature increase, thereby were the latter integrated, the sensor would fail to sense the actual ambient temperature, and detect instead the local temperature also due to dissipation of the power element, thus providing unreliable readings. Anyway, the need is currently felt for a fully integrated circuit which also includes the power element and is nevertheless capable of providing reliable readings.

SUMMARY OF THE INVENTION

In the light of the above situation, it is an aim of this invention to provide an electronic voltage regulating device with compensation for thermal dissipation, particularly for alternators, which affords accurate control of the output voltage in a fully integrated structure.

Within the above general aim, it is a particular object of this invention to provide an electronic voltage regulating device which can appropriately compensate for the error due to the heat dissipated in the power circuit, providing reliable readings for a reduced technological expenditure.

Another object of this invention is to provide an electronic voltage regulating device, which can be manufactured with technologies usually employed in the making of integrated circuits.

The above aim, and these and other objects to become apparent hereinafter, are achieved by an electronic voltage regulating device with compensation for thermal dissipation, particularly for alternators, according to the invention, comprising a control stage sensitive to temperature and generating a signal dependent on the temperature sensed, and a power stage arranged in cascade with said control stage for powering a load on the basis of said sensed temperature signal, which is characterized in that it comprises means for sensing the power dissipated in said power stage and supplying a signal correlated to said dissipated power, and means for compensating for the error due to temperature variations brought about by said dissipated power, said means for compensating receiving said sensed temperature signal and said dissipated power signal and generating a compensated temperature signal.

BRIEF DESCRIPTION OF THE DRAWINGS

Further features and advantages will be more clearly understood from the following description of a preferred, but not exclusive, embodiment, given herein with reference to the accompanying illustrative and not limitative drawings, where.

DESCRIPTION OF THE PREFERRED EMBODIMENTS

Figure 1:
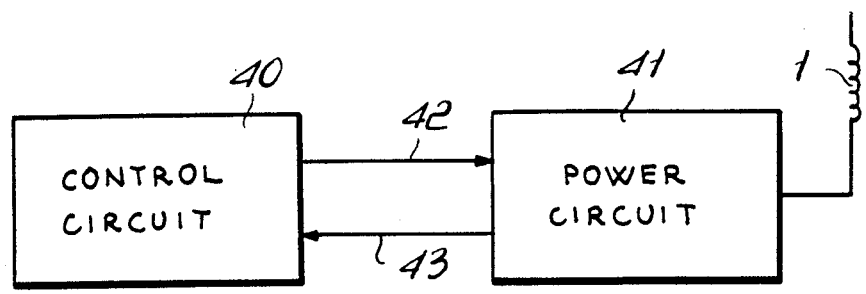
FIG. 1 shows a block diagram of the inventive device.

With reference to FIG. 1, a device according to the invention may be easily represented by a first block 40 forming the control circuit and a second block 41 forming the power circuit. In particular, the control circuit 40 comprises the voltage sensitive element and supplies over the line 42 an electric signal which is correlated to the ambient temperature to suitably drive the power circuit 41 connected with its output to a load 1, here the power winding of an alternator for a motor car battery. The power circuit 41 comprises on its interior means adapted to sense the power dissipated within the block 41 and supplying, in output, a proportional signal to that dissipated power, which signal is supplied over the line 43 to the control circuit comprising on its interior means for compensating the temperature variations due to the power being dissipated on the basis of information supplied over the line 43.

Figure 2:
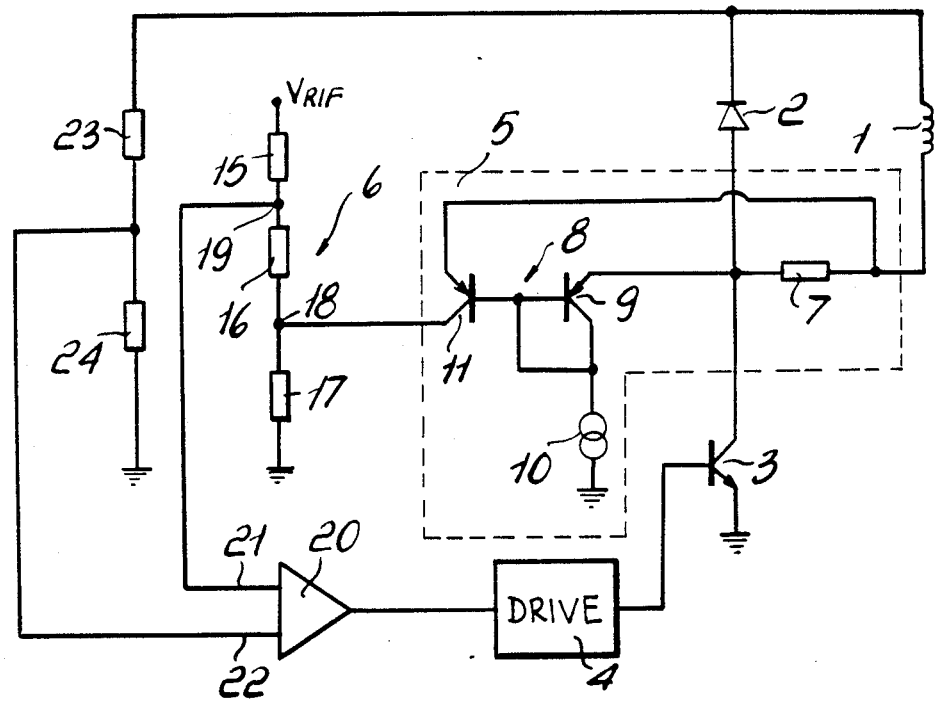
FIG. 2 shows a schematical circuit diagram constituting one embodiment of the diagram of FIG. 1.

In particular, detection of the power dissipated within the power circuit 41 may take place in any of several ways, for example, by measuring the current being supplied to the load 1, or by detecting the operational period (duty cycle) of the power element driving the load. In FIG. 2 there is shown a circuit embodiment which affords implementation of the solution by measuring the load supply current.

With reference to FIG. 2, the exemplary device shown comprises, additionally to the excitation winding of the alternator 1 and a diode 2 connected in parallel thereto for protection, a power element 3 (typically a Darlington or some other power switching element), a block 4 driving the power element 3, a stage 5 for detecting the current supplied to the winding 1, and a device for compensating voltage variations, generally designated with the reference numeral 6. In detail, the stage 5 for detecting the current supplied to the load 1 comprises a resistor 7 placed in series between the collector of the transistor 3 and a terminal of the winding 1 so as to be passed by the same supply current to the load and provide a voltage drop thereacross which is proportional to the current itself. The stage 5 also has a differential circuit 8 formed of a pair of PNP+type transistors, respectively indicated at 9 and 11. The transistors 9 and 11 have their bases connected together and the respective emitters each connected to a different terminal of the resistor 7 so as to detect the voltage drop on said resistor. Furthermore, the base and collector of the transistor 9 are short circuited and connected to a reference current generator 10, whilst the collector of the transistor 11 is connected to an intermediate tap 18 of the device for compensating the temperature variations 6 so as to supply a collector current which depends on the current supplied to the load by the power element 3 and depends, therefore, on the power dissipation in that element. As may be seen in the drawing, the voltage variation compensating device is composed of a plurality of resistors 15,16 and 17 placed in series and having a terminal connected to ground and the other terminal connected to a reference voltage $V_{RIF}$ which, as is known, varies with temperature and thus defines the temperature sensing means generating the ambient temperature dependent, reference voltage signal. In particular, that voltage tends to drop as temperature rises, and accordingly, without the device for measuring the dissipated power and compensating for it, would show an error due to power dissipation and hence to the thermal development brought about by the power element 3. That phenomenon is instead compensated by virtue of the action of the signal supplied from the stage 5, as will be explained hereinafter. The compensation stage 6 also has another intermediate tap 19 connected to the input 21 of an error amplifier 20 defining comparing means, the other input whereof, 22, is connected to the intermediate point of a voltage divider composed of a pair of resistors 23 and 24 and which supplies a signal, proportional to the output voltage of the load, which, as conventional, should vary as the ambient temperature varies. This intermediate point of the voltage divider thus defines a control circuit input. The output control signal generated by the amplifier 20 is hence supplied to the drive block 4 which will suitably drive the base of the power element 3 generating a drive signal for the load 1.

The operation of the voltage regulating device according to the invention is very simple and may be readily understood from an examination of the circuit shown in FIG. 2. In particular where ambient conditions dictate increased power to the load 1, the current supplied through the power element 3 will increase causing a corresponding increase in the signal supplied from the stage 5. That increased power supply current results in a local temperature increase which involves a reduction in the ambient temperature dependent reference voltage $V_{RIF}$. That voltage reduction, being undesired because due to an internal condition of the regulating circuit, is compensated, by virtue of the voltage increase at the terminal 18 due to the increased current from the stage 5 and proportional to the dissipated power and hence to the heat generated by the power circuit. Consequently, by an appropriate selection of the values of the circuit components, it becomes possible to obtain a compensation for the temperature variation due to the power element and ultimately, therefore, supply at the input 21 of the amplifier 20 of a signal only proportional in practice to the ambient temperature being monitored. Consequently, the comparator 20 will compare the signal supplied at the input 22, proportional to the load voltage to be regulated, with the signal supplied at the input 21 and correlated to the desired voltage for the actual value of the ambient temperature, eliminating the error due to the power circuit itself.

As may be understood from the foregoing description, the invention fully achieves the objects set forth. In fact a circuit has been provided wherein the power element for powering the load can be integrated because the device further comprises means which practically reduce the error due to the power dissipated within the power circuit. That device is extremely simple and may be implemented in accordance with ordinary integration techniques without involving any special difficulties.

The circuit, moreover, is highly reliable and can find application every time that one wishes to provide compensation for the temperature variations due to the dissipation of a power element.

The invention herein is susceptible to many modifications and changes, all falling within the scope of the inventive concept. In particular it should be noted that, while the specific embodiment shown achieves compensation for the power dissipated by measuring the current fed to the load, that compensation may be also accomplished by measuring the duty cycle, this being also correlated to the dissipated power.

Furthermore, all of the technical details may be replaced with technical equivalents thereof.

I claim:

1. An integrated electronic device for regulating the voltage of a load, in particular an alternator, with compensation of internal heat dissipation, comprising a control stage and a power stage, said control stage comprising a control input connectable to the load for receiving therefrom a load voltage signal, temperature sensing means for generating an ambient temperature dependent reference voltage signal, comparing means connected to said control input and said sensing means for generating an output control signal, said power stage having a power stage input receiving said output control signal and a power stage output connectable to said load, said power stage generating a drive signal to be supplied to said load and having an internal thermal dissipation, said power stage including dissipation sensing means for detecting said drive signal and generating a thermal dissipation signal correlated thereto, and said control stage further including dissipation compensating means interposed between said temperature sensing means and said comparing means for receiving said thermal dissipation signal and said ambient temperature dependent voltage signal and for generating a compensated, ambient temperature dependent control signal fed to said comparing means.

2. A device according to claim 1, wherein said drive signal is a current signal and said dissipation sensing means detect said current signal.

3. A device according to claim 1, wherein said power element is a switching element having a duty cycle, and said dissipation sensing means detect said duty cycle.

4. A device according to claim 1, wherein said drive signal is a current signal and said dissipation sensing means comprise a resistor inserted in series between said power stage output and said load, said resistor being flown by said current signal and generating a dissipated power voltage signal, said dissipation sensing means further comprising a differential stage having a pair of input terminals connected across said resistor and a differential stage output connected to said dissipation compensating means of said control stage for supplying said compensating means with a current proportional to said current signal.

5. A device according to claim 4, wherein said dissipation compensating means comprise a plurality of resistive elements connected in series and having an end terminal connected to said temperature sensing means, a first intermediate tap connected to said differential stage output and a second intermediate tap defining a compensation means output supplying a compensated, ambient temperature dependent control signal.

* * * * *